United States Patent
Himmelmann (10) Patent No.: US 10,744,437 B2
(45) Date of Patent: Aug. 18, 2020

(54) VENTED DYNAMIC PRESSURE RECOVERY MODULE FOR AIRCRAFT ECS

(71) Applicant: Hamilton Sundstrand Corporation, Charlotte, NC (US)

(72) Inventor: Richard A. Himmelmann, Beloit, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 410 days.

(21) Appl. No.: 15/645,030

(22) Filed: Jul. 10, 2017

(65) Prior Publication Data
US 2019/0009203 A1    Jan. 10, 2019

(51) Int. Cl.
| B01D 45/00 | (2006.01) |
| B01D 45/16 | (2006.01) |
| B64D 13/08 | (2006.01) |
| B01D 53/26 | (2006.01) |
| B01D 45/06 | (2006.01) |
| B64D 13/06 | (2006.01) |

(52) U.S. Cl.
CPC ............. *B01D 45/16* (2013.01); *B01D 45/06* (2013.01); *B01D 53/265* (2013.01); *B64D 13/06* (2013.01); *B64D 13/08* (2013.01); *B01D 2259/4575* (2013.01); *B64D 2013/0662* (2013.01)

(58) Field of Classification Search
CPC ...... B01D 45/06; B01D 45/16; B01D 53/265; B01D 2259/4575; B64D 13/06; B64D 13/08; B64D 2013/0662
USPC ... 55/434.2, 441, 448, 456, 459.1, 392, 396, 55/397
See application file for complete search history.

(56) References Cited

U.S. PATENT DOCUMENTS

| 2,506,298 A | * | 5/1950 | Griffen | B04C 3/00 55/416 |
| 3,676,987 A | * | 7/1972 | Wunder | B04C 3/00 55/459.1 |
| 3,885,934 A | * | 5/1975 | Eads | B01D 45/12 55/457 |
| 4,681,610 A | | 7/1987 | Warner | |
| 6,331,195 B1 | | 12/2001 | Faust et al. | |
| 6,524,373 B2 | * | 2/2003 | Afeiche | B01D 45/16 55/396 |
| 6,666,338 B1 | * | 12/2003 | Henriksson | B04C 3/00 209/208 |
| 7,266,958 B2 | | 9/2007 | Milde et al. | |

(Continued)

FOREIGN PATENT DOCUMENTS

| GB | 1206007 A | 9/1970 |
| JP | 2010104906 A | 5/2010 |

(Continued)

OTHER PUBLICATIONS

European Search Report; Application No. 18182640.5; dated Oct. 19, 2018; 16 pages.

*Primary Examiner* — Frank M Lawrence, Jr.
(74) *Attorney, Agent, or Firm* — Cantor Colburn LLP (57) ABSTRACT

A water extractor for an environmental control system of an aircraft includes a water extraction vessel arranged in fluid communication with the separation mechanism. The water extraction vessel includes a first portion for receiving a first airstream and a second portion for receiving a second airstream. A stationary diffuser is mounted within the second portion.

16 Claims, 9 Drawing Sheets

(56) References Cited

U.S. PATENT DOCUMENTS

| | | | |
|---|---|---|---|
| 7,591,869 B2* | 9/2009 | Jensen | B64D 13/00 55/396 |
| 2002/0144599 A1* | 10/2002 | Afeiche | B01D 45/16 95/269 |
| 2003/0115843 A1* | 6/2003 | Haland | B01D 45/16 55/392 |
| 2008/0087017 A1* | 4/2008 | Van Nimwegen | F01N 3/005 60/599 |
| 2008/0271421 A1 | 11/2008 | Darke et al. | |
| 2015/0090120 A1* | 4/2015 | Au | B03C 9/00 95/70 |

FOREIGN PATENT DOCUMENTS

| | | | |
|---|---|---|---|
| WO | 9959867 | A1 | 11/1999 |
| WO | 0209846 | A2 | 2/2002 |

* cited by examiner

VENTED DYNAMIC PRESSURE RECOVERY MODULE FOR AIRCRAFT ECS

BACKGROUND

Exemplary embodiments disclosed herein relate to environment control systems and, more particularly, to removal of water from an airflow within an aircraft environmental control system (ECS).

As a humid airstream is cooled within a heat exchanger of an environmental control system of an aircraft, condensation typically forms resulting in droplets of moisture being entrained within the airstream. These droplets of moisture are generally removed by a water collector location downstream from the heat exchanger and upstream from an air cycle machine of the environmental control system. If the moisture is not removed from the airstream, within the turbine of the air cycle machine, the droplets may freeze causing a build-up of ice on one or more of the turbine blades. The ice can lead to imbalance due to non-uniform shedding thereof, thereby reducing system reliability and efficiency. The moisture buildup also leads to corrosion of the system components.

A centrifugal means is typically positioned within the flow path of the airstream causing the airstream to spin. The rotation of the airstream results in the stratification of the air stream with the dry air being located at the center of the flow path and the water being arranged about the periphery of the flow path. As the airstream flows into a downstream water separation vessel, the water condenses on the walls of a water receiving portion and then gravity causes the moisture to fall out of the separator as the water is subjected to a tortuous flow path of increasing volume. In conventional environmental control systems, the centrifugal means is arranged in line with the water separation vessel. However, in newer environmental control systems, the flow path between the centrifugal means and the water separation vessel includes at least one bend. As a result, only a portion of the water within the airstream is collected within the water separation vessel.

BRIEF DESCRIPTION

According to an embodiment, a water extractor for an environmental control system of an aircraft includes a water extraction vessel arranged in fluid communication with the separation mechanism. The water extraction vessel includes a first portion for receiving a first airstream and a second portion for receiving a second airstream. A stationary diffuser is mounted within the second portion.

In addition to one or more of the features described above, or as an alternative, in further embodiments the diffuser includes a shaft and plurality of vanes extending outwardly from a first end of the shaft.

In addition to one or more of the features described above, or as an alternative, in further embodiments the shaft is generally hollow.

In addition to one or more of the features described above, or as an alternative, in further embodiments the first end of the shaft has a first diameter and a second end of the shaft has a second diameter, the second diameter being smaller than the first diameter.

In addition to one or more of the features described above, or as an alternative, in further embodiments the water extraction vessel includes a guide duct extending generally from an inlet portion to an outlet portion of the water extraction vessel, wherein at least one of the plurality of vanes is connected to the guide duct.

In addition to one or more of the features described above, or as an alternative, in further embodiments the at least one of the plurality of vanes is integrally formed with the guide duct.

In addition to one or more of the features described above, or as an alternative, in further embodiments the plurality of vanes are configured to straighten the second airstream.

In addition to one or more of the features described above, or as an alternative, in further embodiments comprising a separation mechanism configured to divide an airstream into the first airstream and the second airstream, the separation mechanism being arranged upstream from and in fluid communication with the water extraction vessel.

In addition to one or more of the features described above, or as an alternative, in further embodiments a pressure drop occurs within the separation mechanism such that a difference in pressure of the separation mechanism and the water extraction vessel draws a portion of the second airstream backward from the water extraction vessel toward the separation mechanism.

In addition to one or more of the features described above, or as an alternative, in further embodiments the diffuser includes a shaft having a generally hollow interior, and the portion of the second airstream drawn backward from the water extraction vessel toward the separation mechanism flows through the generally hollow interior of the shaft.

In addition to one or more of the features described above, or as an alternative, in further embodiments wherein the separation mechanism further comprises: an inlet conduit; and a body coupled to the inlet conduit, an end of the body being arranged in fluid communication with the water extraction vessel, wherein the inlet conduit extends generally perpendicular to a longitudinal axis of the body.

In addition to one or more of the features described above, or as an alternative, in further embodiments the second airstream is located at a center of the body and the first airstream is arranged about a periphery of the second airstream.

According to another embodiment, an environmental control system of an aircraft includes a heat exchanger configured to cool an airstream and a water extractor arranged in fluid communication with an outlet of the heat exchanger. The water extractor includes a separation mechanism for separating the airstream into a first airstream and a second airstream, the first airstream having water droplets entrained therein. A water extraction vessel is axially aligned and in fluid communication with the separation mechanism. The water extraction vessel includes a first portion for receiving the first airstream and a second portion for receiving the second airstream, the water extraction vessel additionally including a diffuser arranged within the second portion.

In addition to one or more of the features described above, or as an alternative, in further embodiments a flow path of the airstream within the separation mechanism includes an angle.

In addition to one or more of the features described above, or as an alternative, in further embodiments the diffuser includes a shaft having a plurality of vanes extending from a periphery of the shaft.

In addition to one or more of the features described above, or as an alternative, in further embodiments a pressure within the separation mechanism is lower than a pressure in the water extraction vessel.

In addition to one or more of the features described above, or as an alternative, in further embodiments a portion of the second airstream is configured to flow through the shaft towards the separation mechanism.

In addition to one or more of the features described above, or as an alternative, in further embodiments the plurality of vanes straighten the second airstream.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

Embodiments herein provide an environmental control system having a separator for separating a liquid from a tangential flow of a medium upstream from a water collection vessel. The medium described herein is generally air and the liquid described herein is generally water; however, it should be understood that other mediums and liquids are also contemplated herein.

Figure 1:
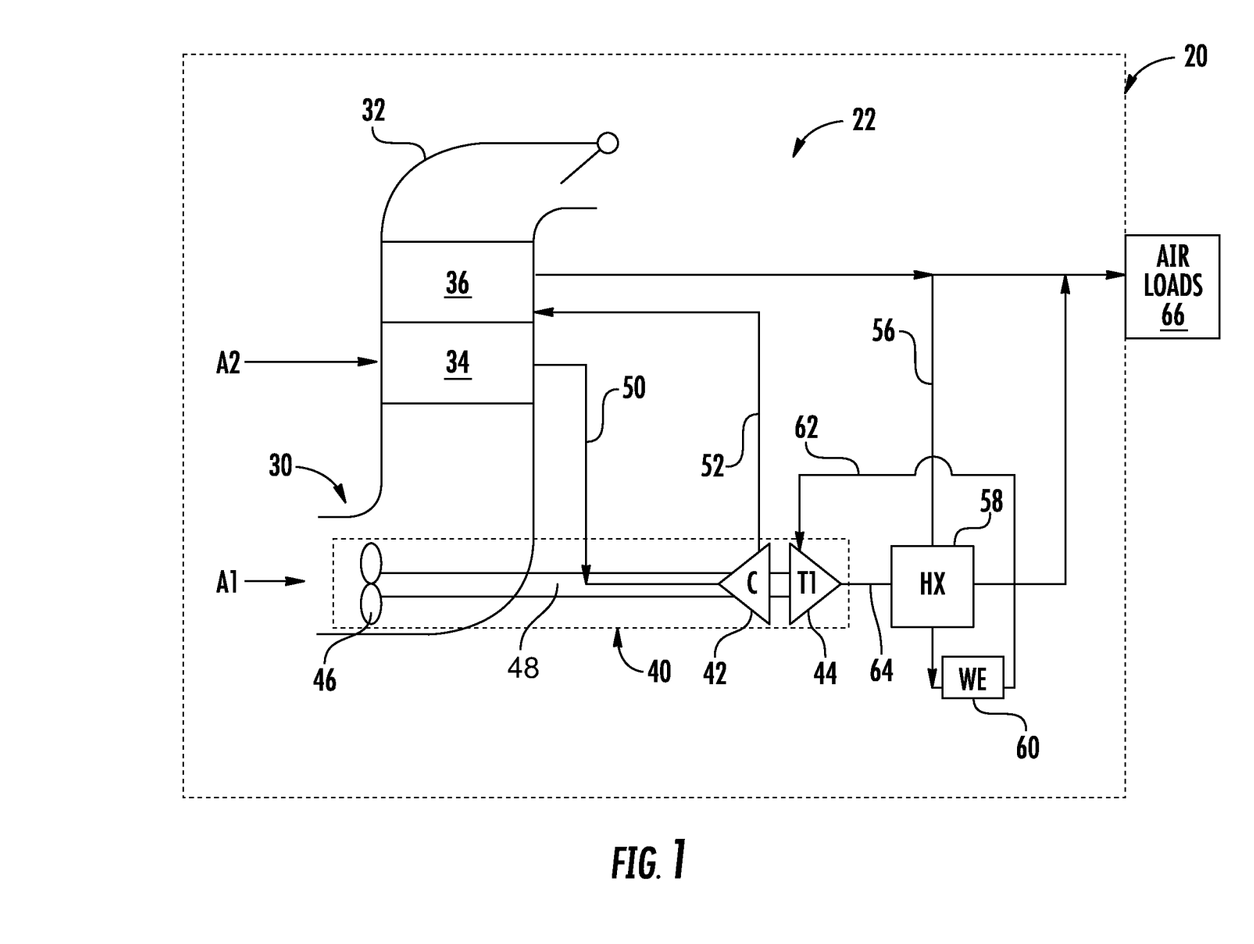
FIG. 1 is a schematic illustration of an environmental control system according to an embodiment.

With reference now to FIG. 1, a schematic diagram of an example of a portion 22, also referred to as a "pack," of an environmental control system (ECS) is depicted according to a non-limiting embodiment. Although the environmental control system 20 is described with reference to an aircraft, alternative applications are also within the scope of the disclosure.

Each pack 22 of an environmental control system (ECS) 20 includes a RAM air circuit 30 including a shell or duct 32 within which one or more heat exchangers are located. The shell 32 can receive and direct a medium A1, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a primary heat exchanger 34 and a secondary heat exchanger 36. Within the primary and secondary heat exchangers 34, 36, ram air, such as outside air for example, acts as a heat sink to cool one or more mediums.

The pack 22 additionally comprises at least one compressing device 40. Each compressing device 40 includes a compressor 42, a turbine 44, and a fan 46 operably coupled via a shaft 48. In an embodiment, in combination the fan 46, compressor 42, and turbine 44 define an air cycle machine (ACM). The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

The turbine 44 is a mechanical device that expands and extracts work from a medium (also referred to as extracting energy). In the compressing device 40, the turbine 44 drives the compressor 42 and the fan 46 via the shaft 48. The fan 46 is a mechanical device that can force via push or pull methods a medium (e.g., ram air) through the shell 32 across the heat exchangers 34, 36 and at a variable cooling to control temperatures.

In operation, the ECS pack 22 is supplied with a medium A2, such as air bled from a gas turbine engine of the aircraft for example. It should be understood that the ECS may include any number of ECS packs 22 configured to supply conditioned air to various heat loads of the aircraft. The medium A2 is input to the primary heat exchanger 34 such that the bleed air A2 is in a heat exchange relationship with another medium A1, such as ram or ambient air for example. After the bleed air A2 is cooled in the primary heat exchanger 34, the resulting cooler air is communicated through a passage 50 to the compressor 42 of the compressing device 40. Within the compressor, the bleed air A2 is compressed to a high pressure.

Compressed air A2 exits the compressor 42 through a passage 52 and is provided to the secondary heat exchanger 36 where the air A2 is further cooled by heat exchange with the medium A1. Compressed, cooled air bearing water vapor exits from the secondary heat exchanger 36 and flows through a duct 56 to a condensing heat exchanger 58. The condensing heat exchanger 58 is configured to further cool the air A2 and water is separated from the cooled air A2 via a water extractor 60. Dehumidified air exits the water extractor 60 and is provided, through a passage 62, to the turbine 44. The bleed air A2 is expanded and water vapor in the air is further condensed through the turbine 44 of the ACM 40. The cooled air A2 flows through a passage 64 back to the condensing heat exchanger 58, where the air is heated to a relatively warmed temperature, and is then supplied to the one or more air loads (illustrated schematically at 66) of the aircraft, such as to the cabin for example. It should be understood that the ECS pack 22 illustrated and described herein is intended as an example only, and any ECS system 20 including a water extractor 60 is within the scope of the disclosure.

Figure 2:
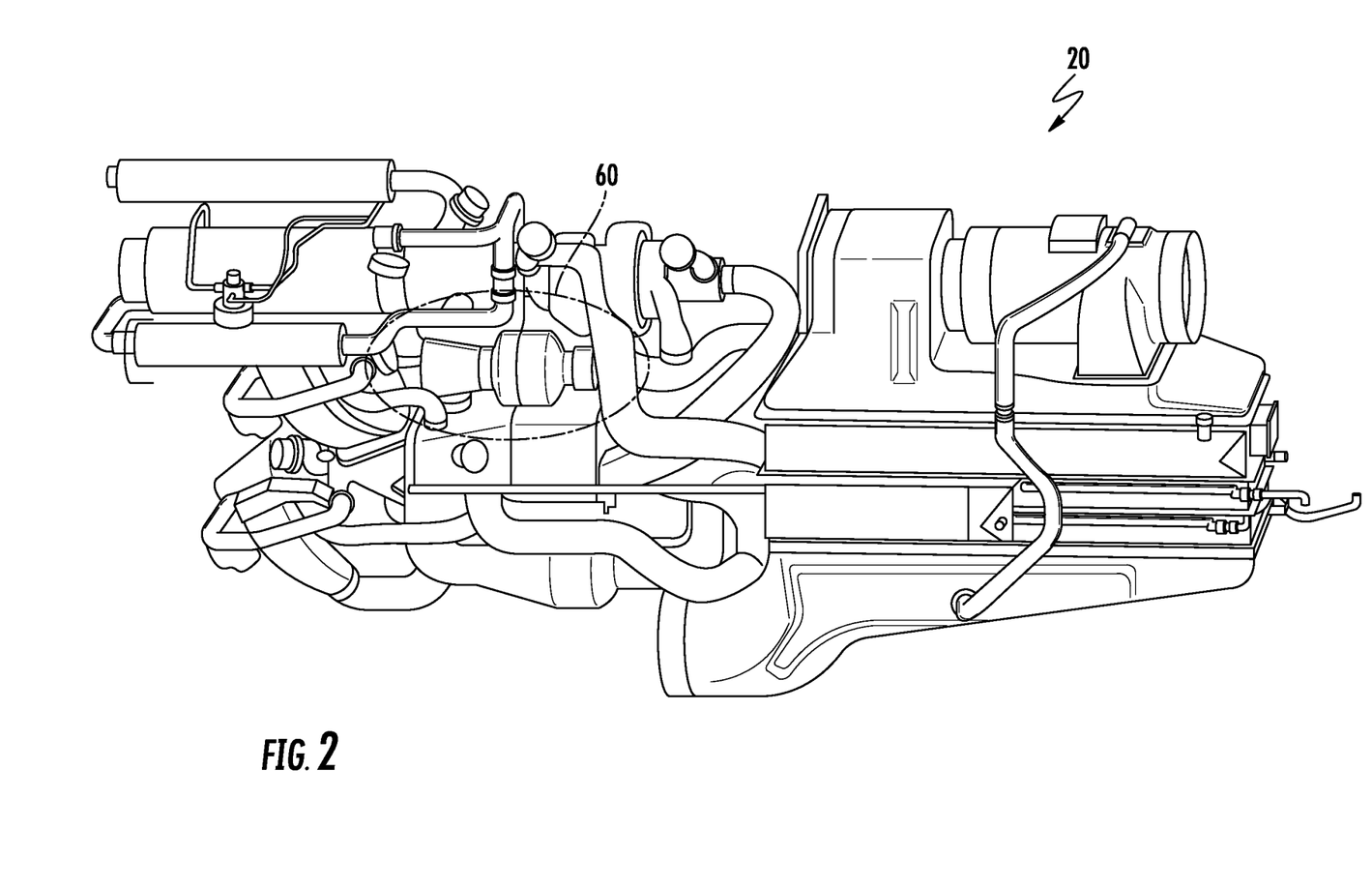
FIG. 2 is a perspective view of a portion of an environmental control system according to an embodiment.
Figure 3:
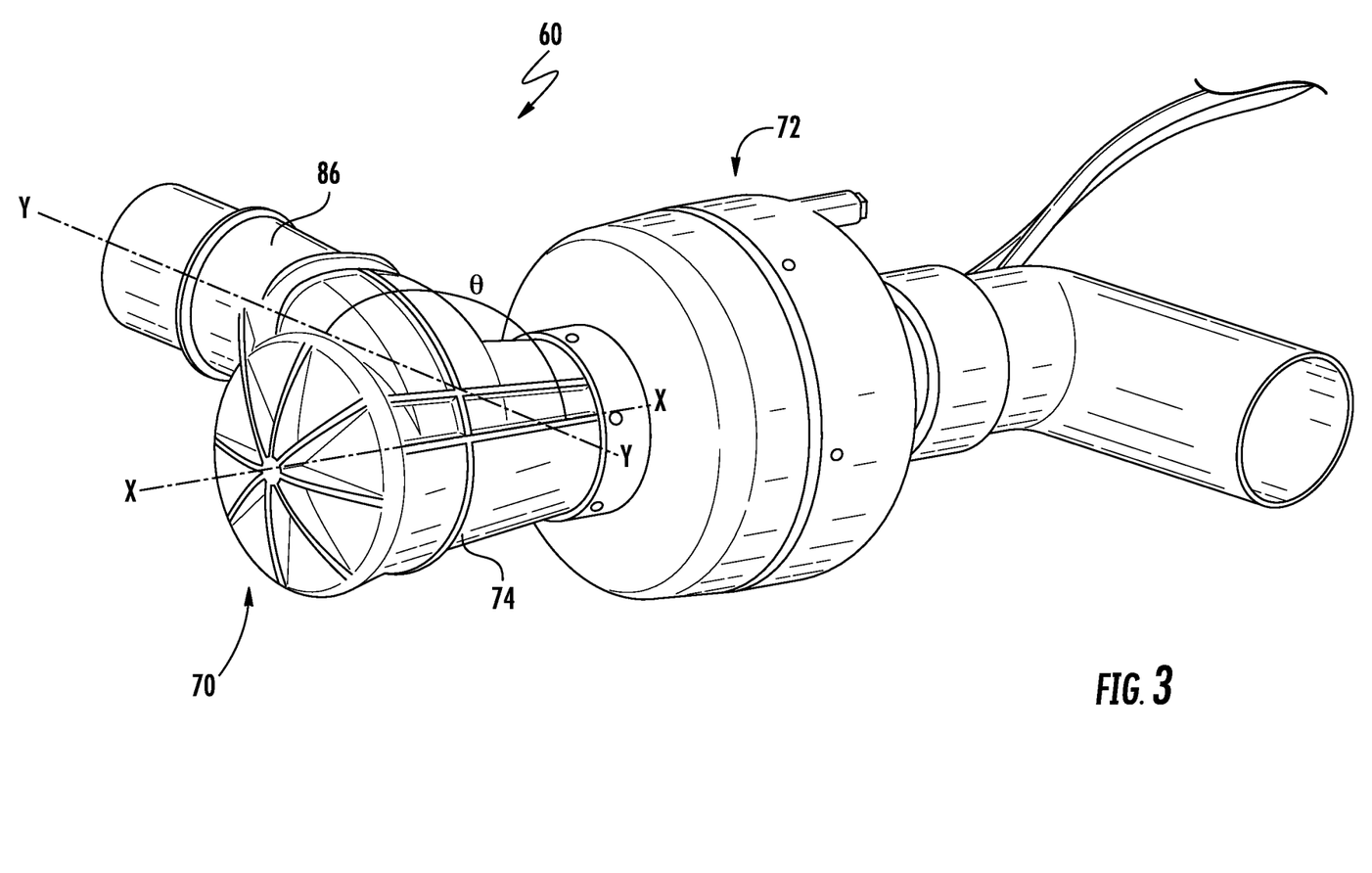
FIG. 3 is a detailed perspective view of a water extractor of the environmental control system of FIG. 2 according to an embodiment.
Figure 4A:
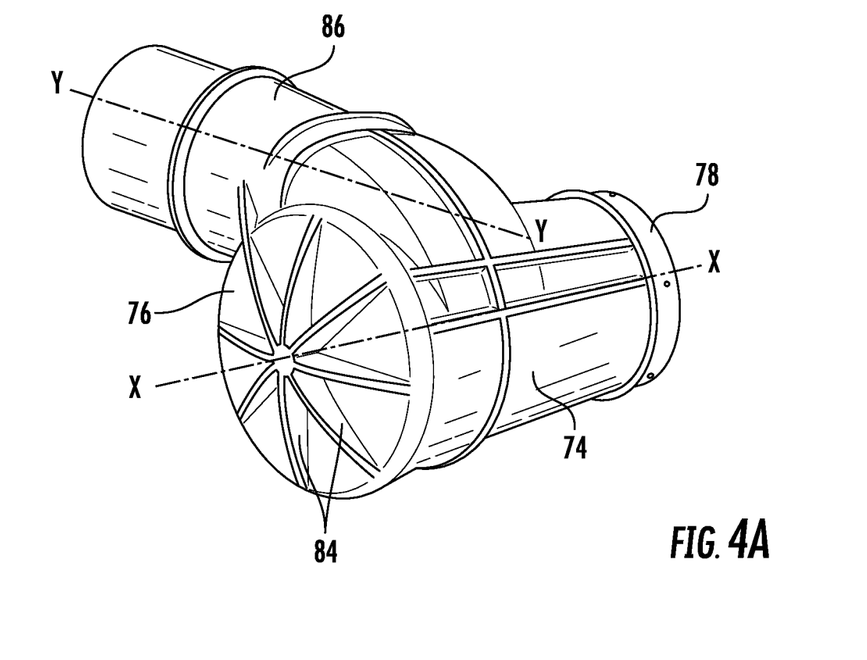
FIGS. 4A, 4B, and 4C are various views of a separation mechanism of the water extractor of FIG. 3 according to an embodiment.
Figure 4B:
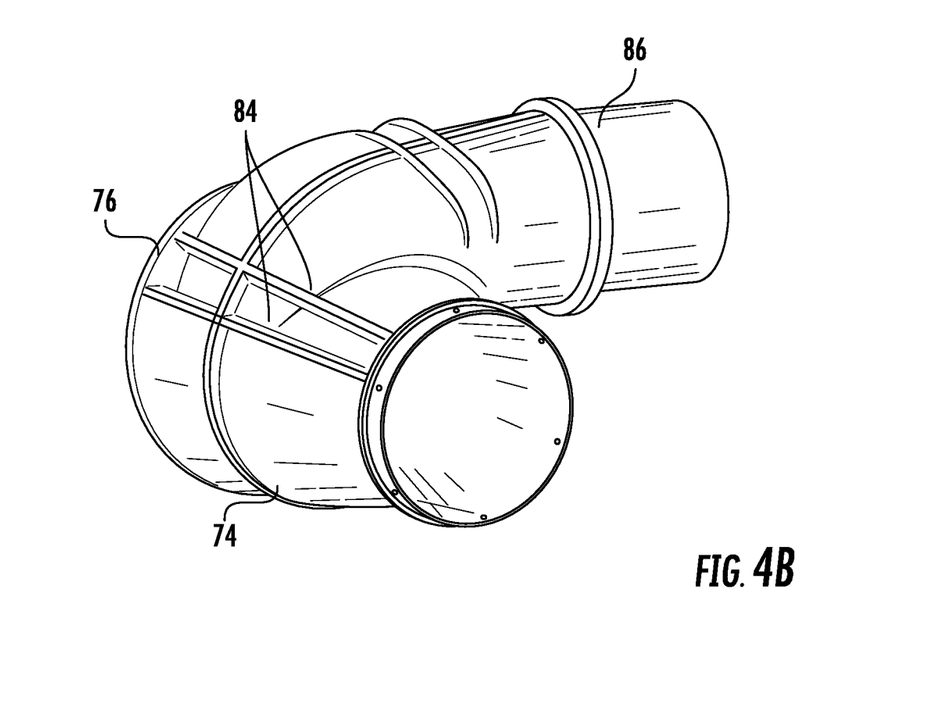
Figure 4C:
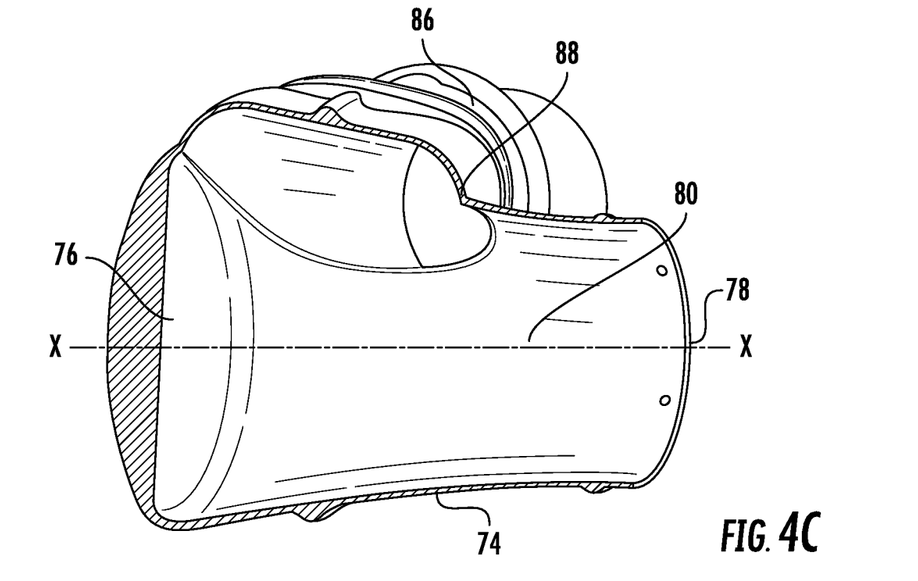

An example of at least some of the structural components of the ECS 20 is shown in FIG. 2, and a detailed view of the water extractor 60 is illustrated in FIG. 3. The water extractor 60 includes a separation mechanism 70 fluidly coupled to a water extraction vessel 72. The separation mechanism 70 is configured to separate water from an airstream provided thereto. In the non-limiting embodiment illustrated in FIGS. 4A-4C, the separation mechanism 70 includes a body 74 having a first upstream end 76 and a second downstream end 78 that defines a longitudinal axis X of the body 74. The first end 76 of the body 74 is sealed to direct the flow of the airstream within the hollow interior 80 of the body 74 towards the second end 78. The second end 78 is generally open and may be directly or indirectly connected to the water extraction vessel 72. In the illustrated, non-limiting embodiment, a diameter of the first end 76 is greater than a diameter of the second end 78 such that the body 74 has a generally frusto-conical or tapered shape. However, it should be understood that embodiments where the body 74 has a generally cylindrical shape or another suitable shape are also contemplated herein.

Figure 5:
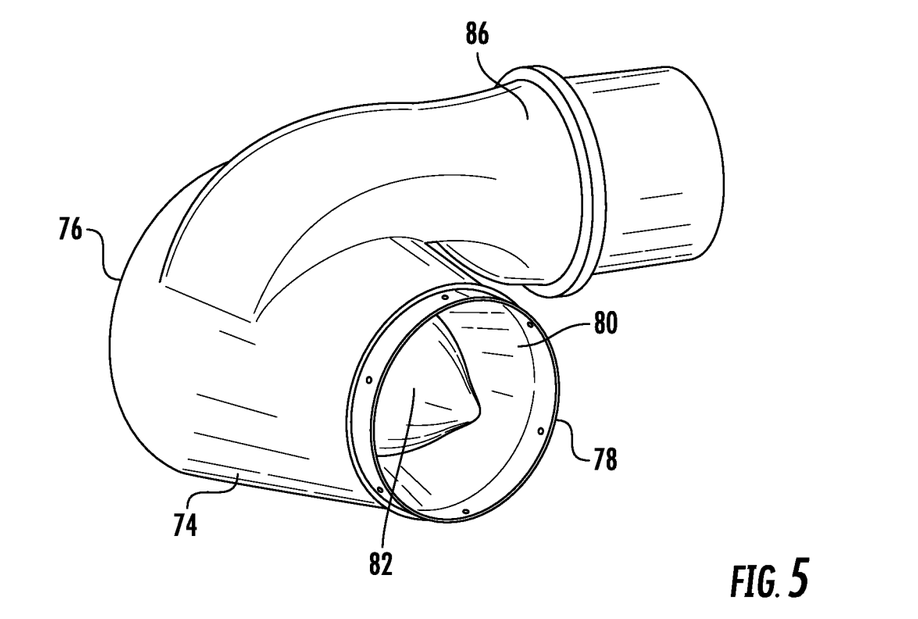
FIG. 5 is a perspective view of a separation mechanism having an inner member according to an embodiment.
Figure 6:
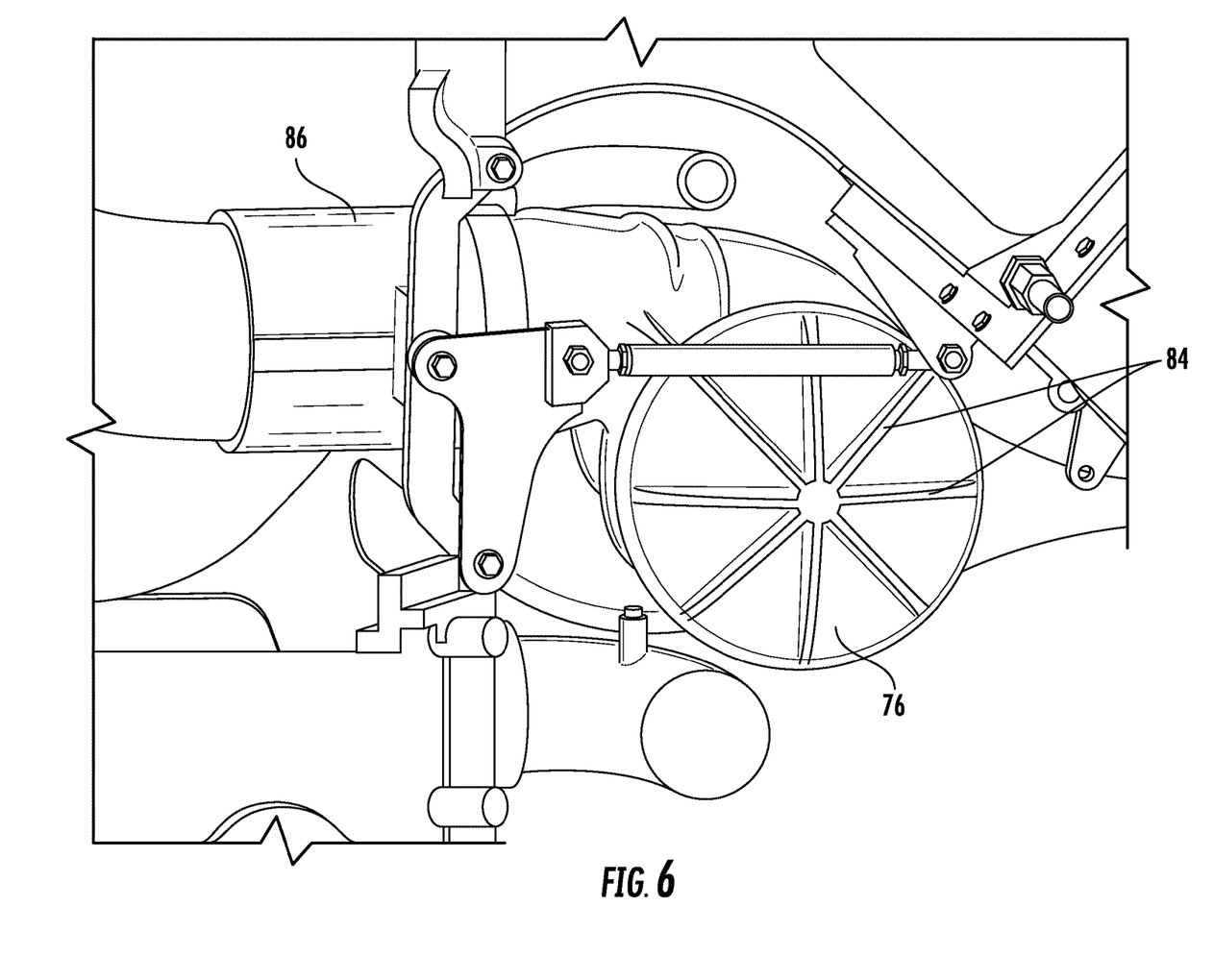
FIG. 6 is an end view of the water extractor of FIG. 3 according to an embodiment.

In an embodiment, best shown in FIG. 5, an inner member 82 may extend within the interior 80 of the body 74, along at least a portion of the longitudinal axis X thereof. For example, the inner member 82 may be integrally formed with or coupled to the first end 76 of the body 74. The inner member 82 may have a shape complementary to or different from the shape of the body 74. However, the longitudinal axis of the inner member 82 and the longitudinal axis X of the body 74 are arranged generally coaxially. An outer diameter of the inner member 82 is smaller than an inner diameter of the body 74 such that the airstream is able to flow about the periphery of the inner member 82, between the inner member 82 and the body 74, over the length of the body 74. Alternatively, or in addition, one or more ridges or ribs 84 may be formed about the exterior surface of the separator mechanism to enhance the structural rigidity thereof.

Figure 7:
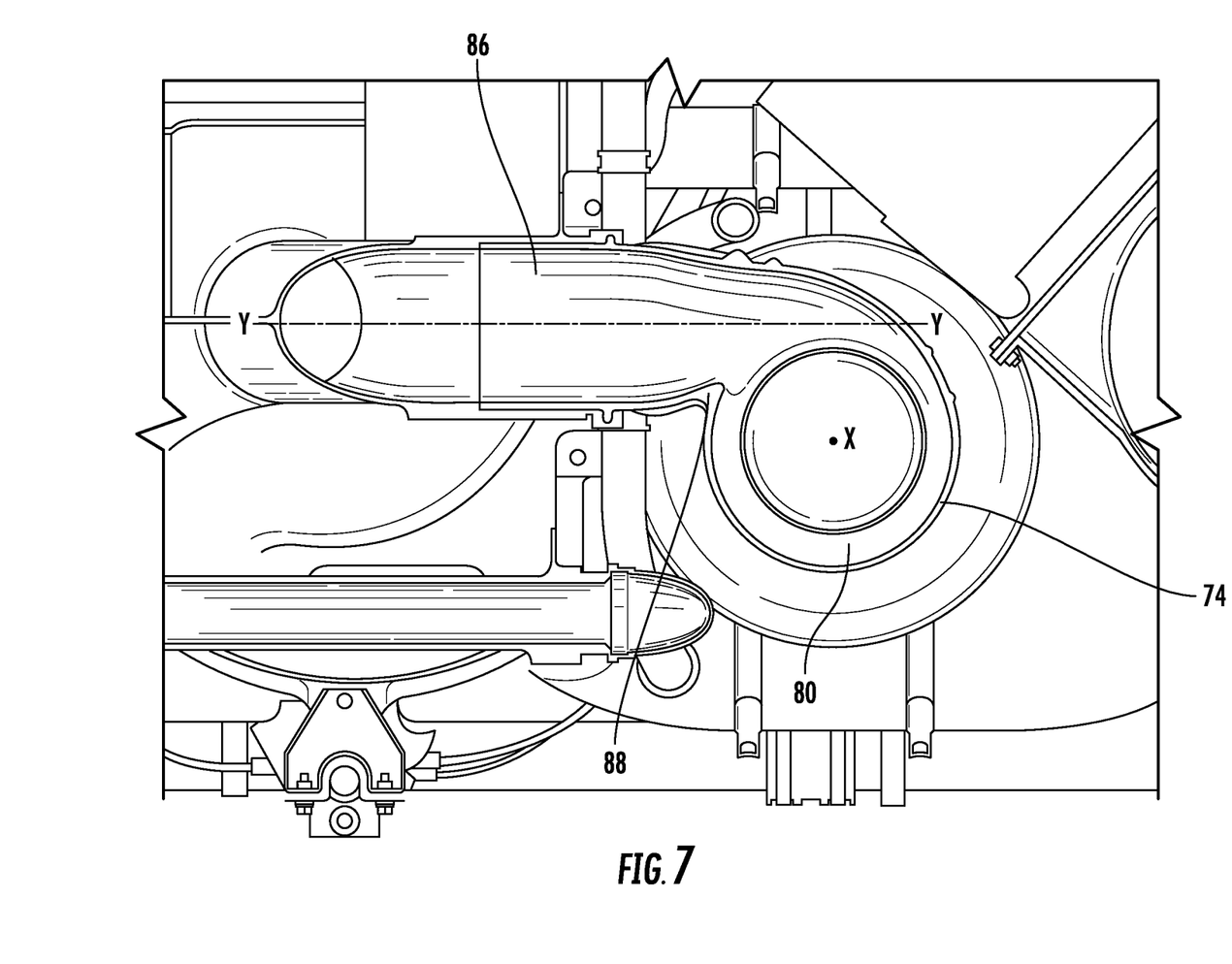
FIG. 7 is a cross-sectional view of the separation mechanism of FIG. 6 taken through the inlet conduit according to an embodiment.

The separator mechanism 70 additionally includes an inlet conduit 86 which extends at an angle θ to the longitudinal axis X of the body 74. In the illustrated, non-limiting embodiment, the angle θ is shown as being 90 degrees such that the inlet conduit 86 is generally perpendicular to the longitudinal axis X of the body 74. However, embodiments where the angle θ is less than or greater than 90 degrees, such as between about 5 degrees and about 175 degrees for example, are also contemplated herein. In an embodiment, the inlet conduit 86 is fluidly connected to the hollow interior 80 of the body 74 adjacent the first end 76 to maximize the length of the flow path of the airstream within the body 74. In an embodiment, as best shown in FIG. 7, the inlet conduit 86 is connected to the hollow interior 80 adjacent a periphery of the hollow interior 80, offset from the longitudinal axis X, in a tangential configuration.

Formed at the end of the inlet conduit 86 directly adjacent the hollow interior of the body 74 is a mouth 88. The cross-section of the inlet conduit 86 is configured to vary over the length of the inlet conduit 86 as the airflow moves towards the mouth 88. In an embodiment, the mouth 88 has a generally flattened shape, with a reduced height compared to the upstream portion of the inlet conduit 86. This reduction in cross-sectional area of the mouth 88 relative to the upstream portion of the inlet conduit 86 has the effect of not only accelerating the airstream but also reducing the pressure of the airstream as it flows there through into the hollow interior 80 of the body 74. The contour, including total cross-sectional area and shape of the mouth 88 may be customized based on the requirements of an application, such as a desired pressure or velocity vector for the airstream as it enters the hollow interior 80 of the separation mechanism 70. The separation mechanism 70 illustrated and described herein is intended as an example only, and it should be understood that other suitable water separation mechanisms are also within the scope of the disclosure.

Figure 8:
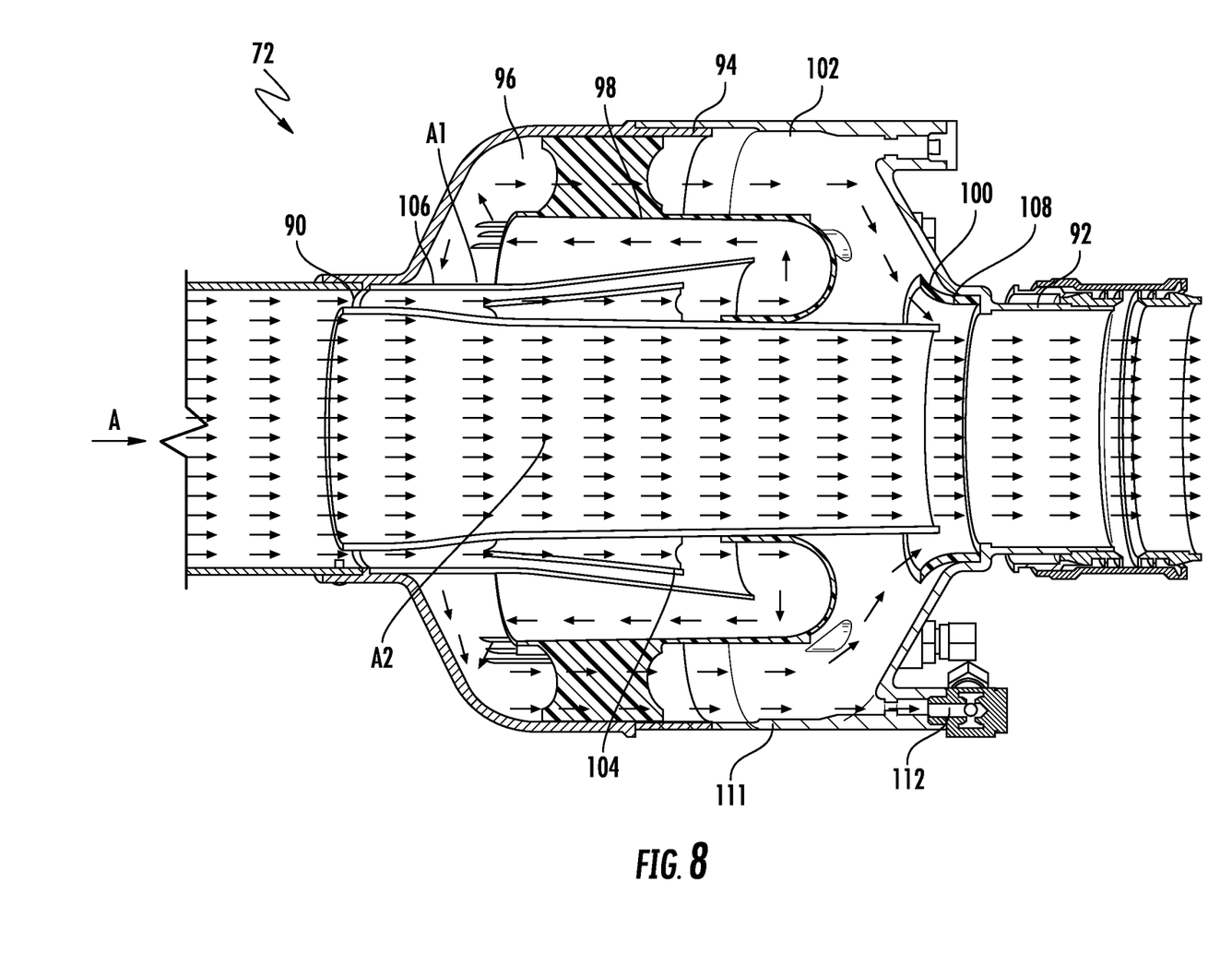
FIG. 8 is a cross-sectional view of a water extractor vessel of the water extractor according to an embodiment.

An example of the water extraction vessel 72 is illustrated in more detail in FIG. 8. The water extraction vessel 72 includes an inlet portion 90 and an outlet portion 92. To decelerate the flow of moisture-laden air, an annular air diffuser 94 concentrically surrounds and is attached to the inlet and output portions 90, 92. An exterior of the diffuser 94 may be constructed as a single component, or alternatively, may be defined by a plurality of segments for ease of assembly. An outer section of the diffuser 94 defines a settling chamber 96 in which the moisture within the decelerated airstream falls naturally therefrom. A wall 98 extending from the inlet portion 90 of the water extraction vessel 72 continuously diverges in the direction of the airflow. Similarly, a wall 100 may extend from the outlet portion 92 having a flared end that is oriented against the flow of the airstream.

An air guide 102 is positioned within the gap between the walls 98, 100 and may be attached to an inner surface of the diffuser 94, such as by one or more webs for example. The air guide 102 defines a labyrinthine flow path of gradually increasing volume to allow a significant airstream deceleration within relatively short axial and radial dimensions while minimizing pressure losses as the air flows into the main body of the diffuser 94.

A guide duct 104 is attached to the air guide 102 and extends generally from the inlet portion 90 to the outlet portion 92. The upstream end of the duct 104 defines a narrow scupper 106 within the inlet portion 90. The guide duct 104 also extends downstream from the air guide 102 to define an ejector 108 between the outlet wall 100 and the exterior of the guide duct 104. A portion of the guide duct 104 may be tapered inwardly in a downstream direction to accelerate the airstream flowing there within to the pull the dried air from the diffuser 94 through the ejector 108. A water reservoir 111 and drain 112 are provided at the bottom of the diffuser 94. The placement of the drain 112 depends generally on the angular orientation of the reservoir to allow for gravitational drainage.

In operation, an airstream a having condensation, such as water for example, included therein is provided to the water extractor 60. As the airstream passes through the mouth 88 of the inlet conduit 86 into the hollow body 80 of the separation mechanism 70, the speed of the airstream A increases. The tangential position of the inlet conduit 86 relative to the hollow interior 80 imparts a rotational motion to the airstream A about longitudinal axis X. This rotation facilitates separation of the droplets of condensate from the airstream A. The centrifugal force acting on the rotating airstream drives the droplets to the periphery of the airstream A, adjacent an inner surface of the body 74.

Upon reaching the inner surface, the droplets may coalesce into a first fluid stream A1 and the dry air at the center of the body 74 forms a second fluid stream A2. As the first and second fluid streams A1, A2 enter the water extraction vessel 72, the second air stream A2 flows from the inlet portion 90 to the outlet portion 92, and to a downstream component of the environmental control system 20. The first fluid stream A1 is separated from the second fluid stream A2 by the scupper 106. The first fluid stream A1 containing moisture laden air flows outside the guide duct 104 into the diffuser 94. Due to the expanding volume along the flow path defined by the diffuser 94 and air guide 102, the airflow A1 is slowed allowing the water droplets within the airflow to coalesce on the walls of the flow path within the settling chamber 96. The dehumidified air of the first fluid stream A1 is then rejoined with the second fluid stream A2 via the ejector 108. Due to gravity, the water droplets will fall naturally into the water reservoir 111 for subsequent drainage via drain 112. The water may then be provided to another system, such as for cooling or cleaning for example, or may be expelled from the aircraft.

In some embodiments, such as where the separation mechanism 70 is a tangential separation mechanism as described with respect to FIGS. 3-7 for example, a large pressure drop may occur within the separation mechanism 70. In an embodiment, this large pressure drop occurs between the center of the vortex in the tangential separation mechanism 70 and a high pressure zone within a downstream region of the water extraction vessel 72. As a result of this pressure difference, a portion of the fluid is caused to flow backward, in an upstream direction toward the low pressure region of the separation mechanism 70. This difference in pressure can draw part of the fluid flow through the guide duct 104 backwards from the water extraction vessel 72 towards the separation mechanism 70, thereby forming an aerodynamic blockage hindering operation of the water extractor 60.

Figure 9:
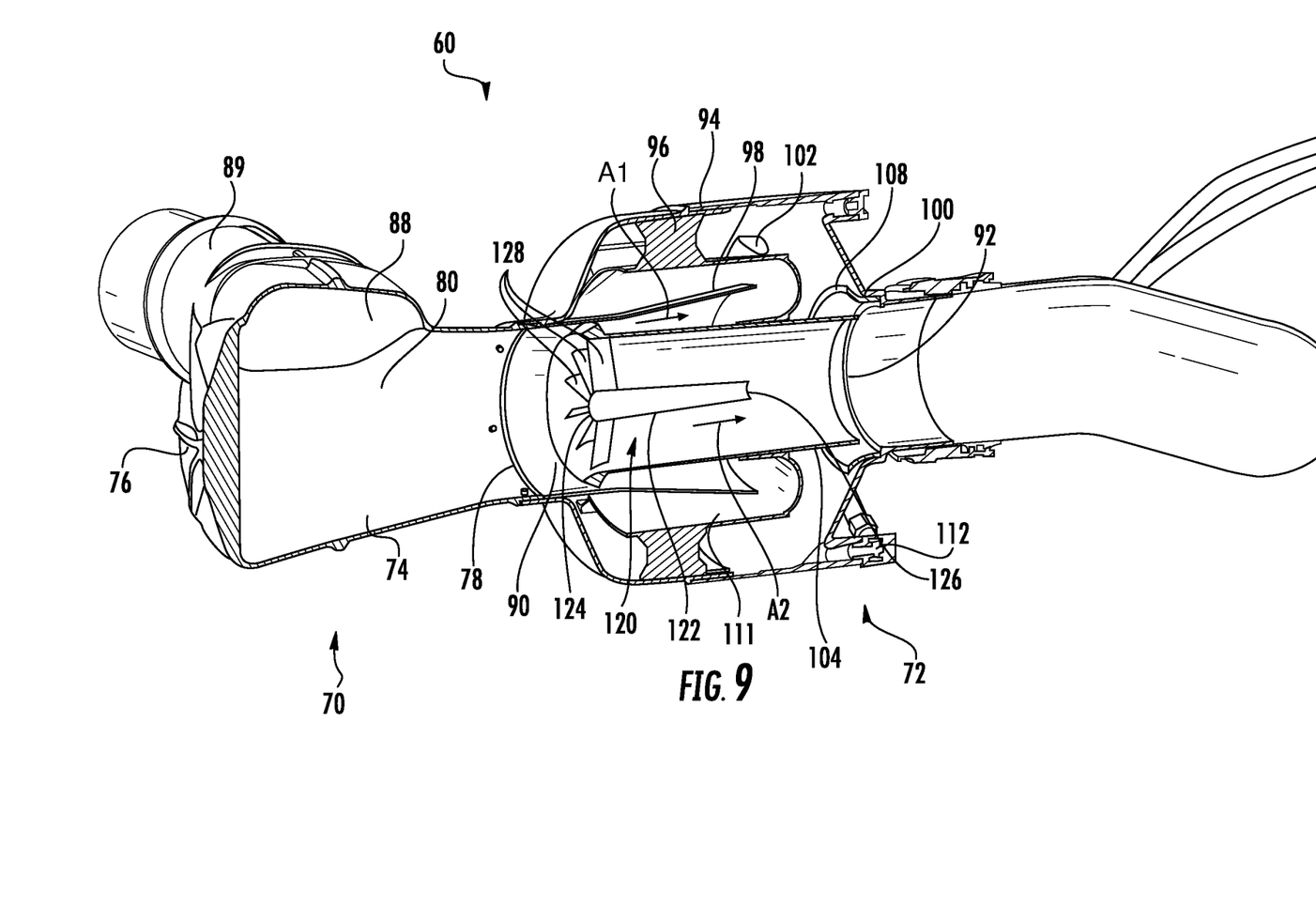
FIG. 9 is a cross-sectional view of a water extraction vessel including a diffuser according to an embodiment.

With reference now to FIG. 9, in an embodiment, the water extraction vessel 72 further comprises a stationary diffuser 120 positioned within the guide duct 104 near the inlet portion 90. The diffuser 120 includes a shaft 122 having a first end 124 and a second end 126. In the illustrated, non-limiting embodiment, the shaft 122 has a generally circular cross-section and has a generally hollow interior that defines a fluid flow path extending between the inlet portion 90 and a downstream portion of the guide duct 104. The size of the shaft 122 is selected based on the desired performance and flow rate of the fluid through the water extraction vessel 72. In an embodiment, the shaft 122 may have a generally tapered shape. By having an inner diameter at the first upstream end 124 of the shaft 122 larger than an inner diameter at the second downstream end 126 of the shaft 122, the speed of the air flowing backwards through the shaft 122 towards the separation mechanism 70 may be reduced. However, it should be understood that embodiments where the shaft 122 is cylindrical with a constant interior diameter, or alternatively, has another shape 122 are also contemplated herein.

Mounted adjacent the first end 124 of the shaft 122 is a plurality of vanes 128. The tip end of one or more of the vanes 128 is integrally formed with the guide duct 104 to mount the diffuser 120 within the fluid flow path. The plurality of vanes 128 are configured to straighten the fluid flow as it moves through the guide duct 104 toward the outlet portion 92. The vanes 128 are substantially uniform and are spaced equidistantly about an outer periphery of the shaft 122. In an embodiment, a cross-section of the vanes 128 may be similar to an airfoil in shape. In addition, the cross-sectional shape of each vane 128 may be generally uniform over the length of the vane, i.e. between root and tip, or alternatively, may gradually increase in area. The vanes 128 may be arranged generally parallel to the fluid flow through the guide duct 104, or may be arranged at an angle relative to the fluid flow.

During operation of the water extractor 60, as a fluid flow moves from the water separation mechanism 70 into the water extraction vessel 72, a portion of the pressure difference generates a backflow. By venting the diffuser 120, i.e. by forming a passageway through the interior of the shaft 122, the backflow is allowed to move upstream towards the separation mechanism 70, without interrupting the main flow through the straightening vanes 128. As a result, interference between the backflow and the main fluid flow at the vanes 128 may be avoided resulting in enhanced pressure recovery.

The water extraction vessel 72 including the diffuser 120 illustrated and described herein is intended for use in a water extractor 60 where a pressure drop in the separation mechanism 70 draws a fluid flow backward. The diffuser 120 not only straightens the flow within the guide duct 104, but also provides a restricted fluid flow path for back flow from the water extraction vessel 72 to the separation mechanism 70. Accordingly, a water extractor 60 including a diffuser 120 has an improved efficiency without degrading the overall system performance and can be easily retrofit into existing aircraft systems.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope hereof.

What is claimed is:

1. A water extractor for an environmental control system of an aircraft comprising:
a separation mechanism for dividing an airstream into a first airstream and a second airstream, wherein the second airstream is located at a center of the separation mechanism and the first airstream is arranged about a periphery of the second airstream;
a water extraction vessel arranged in fluid communication with the separation mechanism, the water extraction vessel including a first portion having a guide duct for receiving the first airstream and a second portion for receiving the second airstream, wherein a stationary diffuser is mounted within the second portion, wherein the second airstream is rejoined with the first airstream adjacent an outlet end of the water extraction vessel.

2. The water extractor of claim 1, wherein the diffuser includes a shaft and plurality of vanes extending outwardly from a first end of the shaft.

3. The water extractor of claim 2, wherein the shaft is generally hollow.

4. The water extractor of claim 2, wherein the first end of the shaft has a first diameter and a second end of the shaft has a second diameter, the second diameter being smaller than the first diameter.

5. The water extractor of claim 2, wherein the water extraction vessel includes a guide duct extending generally from an inlet portion to an outlet portion of the water extraction vessel, wherein at least one of the plurality of vanes is connected to the guide duct.

6. The water extractor of claim 5, wherein the at least one of the plurality of vanes is integrally formed with the guide duct.

7. The water extractor of claim 2, wherein the plurality of vanes are configured to straighten the second airstream.

8. The water extractor of claim 1, wherein a pressure drop occurs within the separation mechanism such that a difference in pressure of the separation mechanism and the water extraction vessel draws a portion of the second airstream backward from the water extraction vessel toward the separation mechanism.

9. The water extractor of claim 8, wherein the diffuser includes a shaft having a generally hollow interior, and the portion of the second airstream drawn backward from the water extraction vessel toward the separation mechanism flows through the generally hollow interior of the shaft.

10. The water extractor of claim 1, wherein the separation mechanism further comprises:
an inlet conduit; and
a body coupled to the inlet conduit, an end of the body being arranged in fluid communication with the water extraction vessel, wherein the inlet conduit extends generally perpendicular to a longitudinal axis of the body.

11. An environmental control system for an aircraft, comprising:
a heat exchanger configured to cool an airstream; and
a water extractor arranged in fluid communication with an outlet of the heat exchanger, the water extractor including:
a separation mechanism for separating the airstream into a first airstream and a second airstream, the first airstream having water droplets entrained therein, and
a water extraction vessel axially aligned and in fluid communication with the separation mechanism, the water extraction vessel including a first portion for receiving the first airstream and a second portion for receiving the second airstream, the water extraction vessel additionally including a diffuser arranged within the second portion.

12. The environmental control system of claim 11, wherein a flow path of the airstream within the separation mechanism includes an angle.

13. The environmental control system of claim 11, wherein the diffuser includes a shaft having a plurality of vanes extending from a periphery of the shaft.

14. The environmental control system of claim 13, wherein a pressure within the separation mechanism is lower than a pressure in the water extraction vessel.

15. The environmental control system of claim 14, wherein a portion of the second airstream is configured to flow through the shaft towards the separation mechanism.

16. The environmental control system of claim 13, wherein the plurality of vanes straighten the second airstream.

* * * * *